J. F. BOYNTON.
Carbureter.

No. 61,309. Patented Jan. 22, 1867.

Witnesses: Inventor:
John F. Boynton

United States Patent Office.

JOHN F. BOYNTON, OF SYRACUSE, NEW YORK.

Letters Patent No. 61,309, dated January 22, 1867.

---

IMPROVED APPARATUS FOR CARBURETTING GAS AND AIR.

---

*The Schedule referred to in these Letters Patent and making part of the same.*

---

TO ALL WHOM IT MAY CONCERN:

Be it known that I, JOHN F. BOYNTON, of the city of Syracuse, Onondaga county, and State of New York, have invented a new and improved apparatus for increasing the quantity of light from ordinary street gas and air, which I have named the "Gas-Light Multiplier;" and I do hereby declare that the following is a full, clear, and exact description of the construction and operation thereof, reference being had to the annexed drawings, in which—

Figure 1:
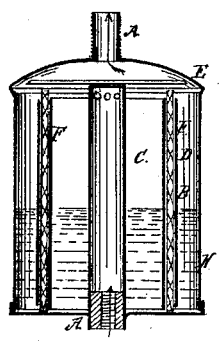

Figure 1 is a sectional view of a small gas-light multiplier constructed for screwing to an upright nipple of a gas-burner with the walls of the double tube equidistant from the inner surface of the reservoir, dividing the vessel into an inner and outer chamber, with a spreader or button over the ends of the tubes and wicks.

Figure 1$^a$ is a cross-section of fig. 1, with a circular wick and tube.

Figure 2:
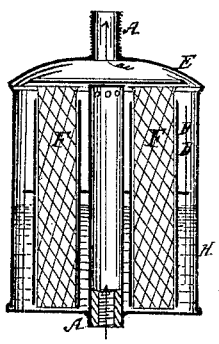

Figure 2 is another arrangement, same as fig. 1, except that the wick-tubes are differently constructed and arranged.

Figure 2$^a$ is a cross-section of fig. 2, showing two single wicks and tubes.

Figure 3:
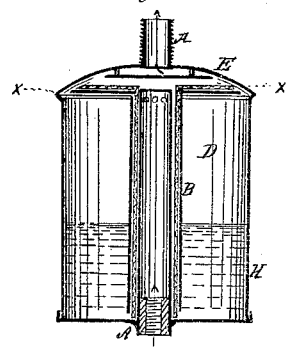

Figure 3 is a modification of fig. 2, showing the walls of the gas-tube forming the inner wall of the wick-tube seen on the upper side of the plate with spreader fastened above.

Figure 3$^a$ is a cross-section of fig. 3 in line $x\ x$ of fig. 3.

Figure 4:
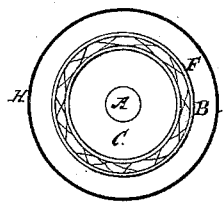
Figure 4:
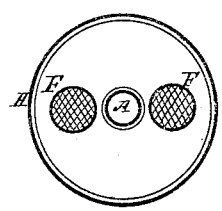
Figure 4:
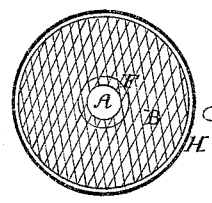
Figure 4:
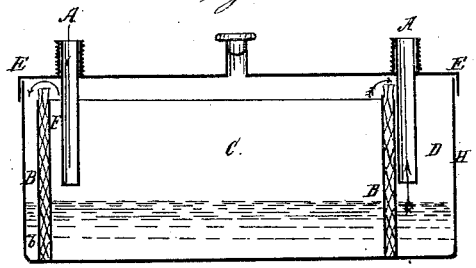

Figure 4 is an arrangement in an ellipsoidal form involving the same principles as shown in figs. 1, 2, and 3, the double tube dividing the vessel into two compartments. This form of the gas-multiplier is designed to be applied at any point of the gas pipes. The form of the double tube is elliptical or slightly flattened, and having capillary material between so arranged that the gas in passing through the vessel is brought in contact with the upper end of the wick, as it passes over the tube from the outer to the inner chamber, or *vice versa*. The fluid being taken up by the wick is absorbed by the gas in passing over it. The drawing shows the elliptical or flattened tubes nearer to one end of the vessel than the other, thereby presenting a better convenience for arranging the entrance and exit pipes. By this arrangement different fluids can be used in the outer and inner chambers at the same time, if desired.

Figure 4$^a$, cross-section of fig. 4, seen from above.

Figure 5:
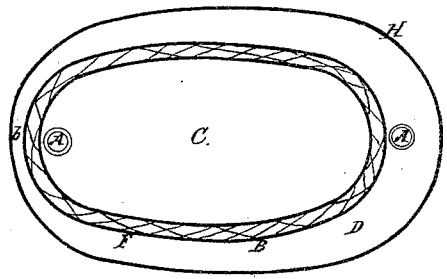
Figure 5:
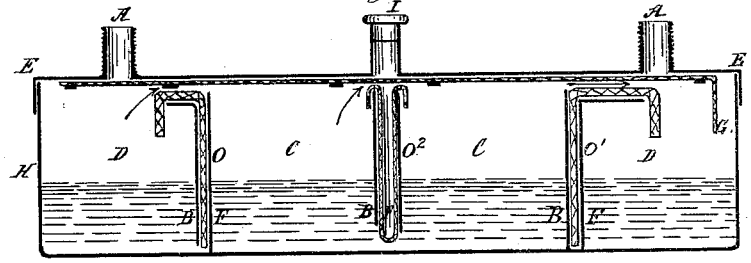

Figure 5 is a gas-light multiplier designed to be used on the supply pipes, made any suitable size, and adapted to any number of burners. It is constructed with a number of double partitions forming a series of flat wick-tubes, O O$^1$ and O$^2$, and dividing the vessel into two compartments, C and D. The inner plates of the double partitions, O and O$^1$, are soldered tightly to the bottom and sides of the vessel, so that different carbonizing fluids may be used in each apartment without mixing previous to evaporization. The tubes O and O$^1$ will draw the fluid from the outer apartment D, and the tube O$^2$ will draw the fluid from the inner apartment, C; but when brought to the tops of the tubes by the capillary action of the wicks, the different fluids will give off their respective vapors to the passing gas commingling together. The several apartments, however, may be each filled with the same carbonizing fluid or the same mixture of fluids. It will be seen that as the tubes containing the wicks or capillary material open only at their bottoms and tops all the liquids brought up by the capillary action of the wicks must be drawn from the lower and heavier strata, so that, while the lighter liquids readily evaporate from their upper surfaces, the heavier will be carried from the bottom through the wicks and tubes and brought in contact with the gas at the top of the vessel, thereby securing a more equal evaporization of the heavier with the lighter material.

$a\ a$ entrance and exit tubes; B tubes containing wicks; $b$ wick-tube seen nearer one end of the vessel than the other; C inner chambers; D outer chambers; E gas-spreader or button over tubes and wicks; F wicks seen in red; G fibrous material attached to the inside of the cover with one end dipping into the compartment; H outer walls of the vessel; I place for filling.

My invention consists in drawing the carbonizing fluid by means of capillary action from the bottom of the box or vessel to the upper portion of the same, so that the heavier portions of the said carbonizing fluid will be constantly evaporated in the upper part of the vessel, and also in causing the gas to move slowly in a thin stratum over the ends of the wicks by which said carbonizing fluid is drawn up, as aforesaid, and where it evaporates and mixes with the gas, enriching it with illuminating elements.

Having thus described my invention and the several modes of carrying it into effect, what I claim in this application, and desire to secure by Letters Patent, is—

1. In a carburetting box or vessel, a tube or tubes, whether flat, cylindrical, or of other form, filled with fibrous or capillary material, and so arranged, with openings at the bottom, that the carbonizing fluid will be constantly drawn by capillary action from the lower and heavier strata and subjected to evaporation in the upper portion of the vessel, substantially as described.

2. In a carburetting box or vessel, constructed and operating as herein described, I claim so arranging the capillary tubes that the gas in its passage through the vessel will move slowly in a thin stratum over the ends of the wicks containing the carbonizing fluid, substantially as described.

3. I also claim dividing the carburetting vessel into two or more compartments by soldering one of the plates forming each of the double partitions or wick-tubes to the bottom and sides of the vessel, so that two or more different carbonizing fluids may be used in the same vessel without mixing previous to evaporization.

JOHN F. BOYNTON.

Witnesses:
    Jos. L. Coombs,
    Edm. F. Brown.